(12) United States Patent
Wu et al.

(10) Patent No.: US 8,478,787 B2
(45) Date of Patent: Jul. 2, 2013

(54) NAME DETECTION

(75) Inventors: Jun Wu, Saratoga, CA (US); Hui Xu, Beijing (CN); Yifei Zhang, Beijing (CN)

(73) Assignee: Google Inc., Mountain View, CA (US)

( * ) Notice: Subject to any disclaimer, the term of this patent is extended or adjusted under 35 U.S.C. 154(b) by 277 days.

(21) Appl. No.: 12/746,465

(22) PCT Filed: Dec. 6, 2007

(86) PCT No.: PCT/CN2007/003464
§ 371 (c)(1),
(2), (4) Date: Jul. 12, 2010

(87) PCT Pub. No.: WO2009/070931
PCT Pub. Date: Jun. 11, 2009

(65) Prior Publication Data
US 2010/0306139 A1    Dec. 2, 2010

(51) Int. Cl.
*G06F 17/30* (2006.01)
(52) U.S. Cl.
USPC .......................................... 707/791; 707/802
(58) Field of Classification Search
USPC .................................................. 707/791, 802
See application file for complete search history.

(56) References Cited

U.S. PATENT DOCUMENTS

| | | | |
|---|---|---|---|
| 7,464,078 B2 | 12/2008 | Dill et al. | |
| 2002/0003898 A1* | 1/2002 | Wu | 382/187 |
| 2003/0229487 A1* | 12/2003 | Wang | 704/4 |
| 2007/0100814 A1* | 5/2007 | Lee et al. | 707/5 |
| 2007/0219777 A1 | 9/2007 | Chu et al. | |
| 2008/0046824 A1* | 2/2008 | Li et al. | 715/739 |

FOREIGN PATENT DOCUMENTS

| | | |
|---|---|---|
| CN | 1955952 | 5/2007 |
| JP | 2005-539283 | 12/2005 |

OTHER PUBLICATIONS

Zhao, et al., Linguistic Theory Based Contextual Evidence Mining for Statistical Chinese Co-Reference Resolution, Journal of Computer Science and Technology 22(4), Jul. 2007, pp. 608-617.
Li, et al., Detecting, Categorizing and Clustering Entity Mentions in Chinese Text, SIGIR 2007 Proceedings, Session 27: Domain Specific NLP, Jul. 2007, pp. 647-654.
International Search Report and Written Opinion for Application No. PCT/CN2007/003464, dated Sep. 18, 2008, 10 pages.
CN Notification of the First Office Action from Chinese Application 200780102296.6 dated Feb. 29, 2012, 6 pages.

(Continued)

*Primary Examiner* — Son T Hoang
(74) *Attorney, Agent, or Firm* — Fish & Richardson P.C.

(57) ABSTRACT

Methods, systems, and apparatus, including computer programs encoded on computer storage media, for name detection. A method includes generating a raw name detection model using a collection of family names and an annotated corpus including a collection of n-grams. The method includes applying the raw name detection model to a collection of semi-structured data to form annotated semi-structured data identifying n-grams identifying names and n-grams not identifying names and applying the raw name detection model to a large unannotated corpus to form a large annotated corpus data identifying n-grams of the large unannotated corpus identifying names and n-grams not identifying names. The method includes generating a name detection model, including deriving a name model using the annotated semi-structured data identifying names and the large annotated corpus data identifying names, deriving a not-name model using the semi-structured data not identifying names, and deriving a language model using the large annotated corpus.

30 Claims, 7 Drawing Sheets

OTHER PUBLICATIONS

International Preliminary Report on Patentability dated Jun. 8, 2010 and Written Opinion mailed Sep. 18, 2008 from International Application No. PCT/CN2007/003464, 5 pages.

Japanese Office Action mailed Oct. 16, 2012 from JP Application No. 2010-536305 (with English translation), 8 pages.

Kondo, M., et al., "Semi-Supervised Term Extraction Using Web Document", Proceedings of the Thirteenth Annual Meeting of the Association for Natural Language Processing, Japan, the Association for Natural Language Processing, Japan, Mar. 19, 2007, pp. 127-130 and republication of Kondo's Master's thesis (with English Abstract), Digital Library of Nara Institute of Science and Technology, Japan, Mar. 23, 2007, 84 pgs.

* cited by examiner

今天黎明时分
$\underbrace{\phantom{xxxx}}_{100}$

FIG. 1A

我听了一首黎明的歌
$\underbrace{\phantom{xxxx}}_{102}$

FIG. 1B

NAME DETECTION

BACKGROUND

This specification relates to name detection, specifically name detection for Chinese, Japanese, and Korean ("CJK") languages.

Name detection is typically used in natural language processing, for example, automatic speech recognition (ASR), machine translation (MT), optical character recognition (OCR), sentence parsing, non-Roman character input method editor (IME), and web search applications.

Naïve Bayesian classification methods can be used to detect if a sequence of characters "X" identifies a name, depending on the ratio of the probability of "X" identifying a name given its context (e.g., characters occurring before or after "X") and the probability of "X" not identifying a name given its context. Language models are used to compute these conditional probabilities. A typical statistical language model is a probability measurement of a word or a sequence of characters given its history (e.g., the occurrence of previous word or character sequences in a collection of data). In particular, a conventional n-gram language model based on a Markov assumption, is used to predict a word or a sequence of characters.

A n-gram is a sequence of n consecutive tokens, e.g. words or characters. A n-gram has an order, which is the number of tokens in the n-gram. For example, a 1-gram (or unigram) includes one token; a 2-gram (or bi-gram) includes two tokens.

A given n-gram can be described according to different portions of the n-gram. A n-gram can be described as a context and a future token (context, c), where the context has a length n−1 and c represents the future token. For example, the 3-gram "x y z" can be described in terms of a n-gram context and a future token. The n-gram context includes all tokens of the n-gram preceding the last token of the n-gram. In the given example, "x y" is the context. The left most token in the context is referred to as the left token. The future token is the last token of the n-gram, which in the example is "z". The n-gram can also be described with respect to a right context and a backed off context. The right context includes all tokens of the n-gram following the first token of the n-gram, represented as a (n−1)-gram. In the example above, "y z" is the right context. Additionally, the backed off context is the context of the n-gram less the left most token in the context. In the example above, "y" is the backed off context.

Each n-gram has an associated probability estimate that is calculated as a function of n-gram relative frequency in training data. For example, a string of L tokens is represented as $C_1^L = (c_1, c_2, \ldots, c_L)$. A probability can be assigned to the string $C_1^L$ as:

$$P(c_1^L) = \prod_{i=1}^{L} P(c_i \mid c_1^{i-1}) \approx \prod_{i=1}^{L} \hat{P}(c_i \mid c_{i-n+1}^{i-1}),$$

where the approximation is based on a Markov assumption that only the most recent (n−1) tokens are relevant when predicting a next token in the string, and the "^" notation for P indicates that it is an approximation of the probability function.

In CJK languages, sentences do not have word boundaries. As a result, sentences need to be segmented automatically before the detection of people's names. Therefore, segmentation errors will be propagated to name detection.

CJK names have morphologic laws that can be obtained from large statistics. For example, 300 common Chinese family names cover 99% or more of the population. Female names often contain characters such as "娜、红、冰、丽" (na, hong, bing, li). Usually, common given names are independent of family names. For example, if statistics are available for a combination of the family name "张" and a given name "娜", a combination of another family name "李" and the given name "娜" identifying a name can be predicted using the statistics of "李" identifying a family name and the statistics of "娜" identifying a given name. Furthermore, some words in Chinese can either be a person's name or a regular word, e.g., 黎明 can be either the name of a famous singer in China, or a common word meaning daybreak. The detection of such a name largely depends on the context.

In addition, CJK names are generally identified using 2-grams (bigrams) or 3-grams (trigrams). Assuming a horizontal convention of reading CJK text from left to the right, the left most character in the context is a family name. The right context is a given name. For example, if "x y z" is a CJK name, then "x" is a family name and "y z" is a given name. As a further example, if "x y" is a CJK name, then "x" is a family name and "y" is a given name.

SUMMARY

Systems, methods, and computer program products for name detection are provided that are particularly useful for detecting names made up of ideographs, e.g., Chinese characters. In general, in one aspect, a method is provided. The method includes generating a raw name detection model using a collection of family names and an annotated corpus including a collection of n-grams, each n-gram having a corresponding probability of occurring as a name in the annotated corpus. The method also includes applying the raw name detection model to a collection of semi-structured data to form annotated semi-structured data, the annotated semi-structured data identifying n-grams identifying names and n-grams not identifying names. The method also includes applying the raw name detection model to a large unannotated corpus to form a large annotated corpus data identifying n-grams of the large unannotated corpus identifying names and n-grams not identifying names. The method also includes generating a name detection model, including deriving a name model using the annotated semi-structured data identifying names and the large annotated corpus data identifying names, deriving a not-name model using the semi-structured data not identifying names, and deriving a language model using the large annotated corpus. Other embodiments of this aspect include systems and computer program products.

Implementations of the aspect can include one or more of the following features. The aspect can further include applying the name detection model to the collection of semi-structured data to form the annotated semi-structured data, the annotated semi-structured data identifying n-grams identifying names and n-grams not identifying names, applying the name detection model to the large unannotated corpus to form the large annotated corpus data identifying n-grams of the large unannotated corpus identifying names and n-grams not identifying names, and generating a refined name detection model. Generating the refined name detection model can include deriving a refined name model using the annotated semi-structured data identifying names and the large annotated corpus data identifying names, deriving a refined not-name model using the semi-structured data not identifying names, and deriving a refined language model using the large annotated corpus.

The name model can include a collection of n-grams from the annotated semi-structured data identifying names and the large annotated corpus identifying names, where each n-gram includes a family name as a left character and a given name as right context, and each n-gram has a corresponding probability of identifying a name. The not-name model can include a collection of n-grams from the annotated semi-structured data not identifying names, where each n-gram includes a family name as a left character and a given name as right context, and each n-gram has a corresponding probability of not identifying a name. The raw name model can include a collection of n-grams from the annotated corpus, where each n-gram includes a left character that is a family name from the collection of family names, and each n-gram has a corresponding probability of identifying a name according to a relative frequency of the name in the annotated corpus. The raw name model can be generated using a collection of foreign family names.

The collection of family names can include a plurality of sparse family names and the raw name detection model uses a single probability of all sparse family names in place of a calculated probability of a specific sparse family name of the plurality of spare family names to identify probabilities of each n-gram, that includes a left character that is a sparse family name, identifying a name. The collection of family names can include a plurality of foreign family names.

In general, in one aspect, a method is provided. The method includes receiving an input string of characters and applying a name detection model to the input string having a plurality of characters. Applying the name detection model includes identifying a most likely segmentation of the plurality of characters where the plurality of characters do not include one or more names, detecting one or more sequences of characters of the plurality of characters as potentially identifying one or more names, identifying a segmentation of the plurality of characters where the plurality of characters include the one or more potential names, and segmenting the plurality of characters as including the one or more names when the likelihood of the segmentation including the potential one or more names is greater than the most likely segmentation not including one or more names. Other embodiments of this aspect include systems and computer program products.

Implementations of the aspect can include one or more of the following features. The aspect can further include detecting one or more names when the plurality of characters is segmented as including one or more names. The aspect can further include receiving a string including a plurality of characters and calculating a probability that a particular sequence of the string identifies a name, the name includes a family name and a given name, including: when the frequency of the particular sequence in a corpus is less than a threshold value, determining the probability that the particular sequence identifies a name as a function of a relative frequency that the portion of the sequence representing a given name occurs with any family name and the relative frequency of the portion of the sequence representing the family name.

The aspect can further include receiving user input data and applying the raw name detection model to the user input data to form annotated user input data, the annotated user input data identifying n-grams identifying names and n-grams not identifying names. Generating the name detection model can further include deriving the name model using the annotated user input data identifying names, deriving the not-name model using the annotated user input data not identifying names, and deriving a language model using the annotated user input data.

Particular embodiments of the subject matter described in this specification can be implemented to realize one or more of the following advantages. CJK name detection can be performed with or without pre-segmenting input text into words, preventing word segmentation errors that result in name detection errors. Training a name detection model does not require large amounts of human annotated data. Some training data can be applied to semi-structured data (e.g., descriptions of downloads in xml files). A vast amount of unannotated data, in particular, input method editor (IME) user inputs, IME user dictionaries, web pages, search query logs, emails, blogs, instant message (IM) scripts, and news articles can be used to train the name detection model. The use of this data guarantees both high precision and high recall in name detection. A name detection model can also be used to detect names with sparse family names and foreign names. In addition, CJK name detection includes iterative training to further refine the name detection model to detect names added to the previous name detection model.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 1A-1B show example Chinese text.

Like reference numbers and designations in the various drawings indicate like elements.

DETAILED DESCRIPTION

Formula for Detecting Names

Figure 2:
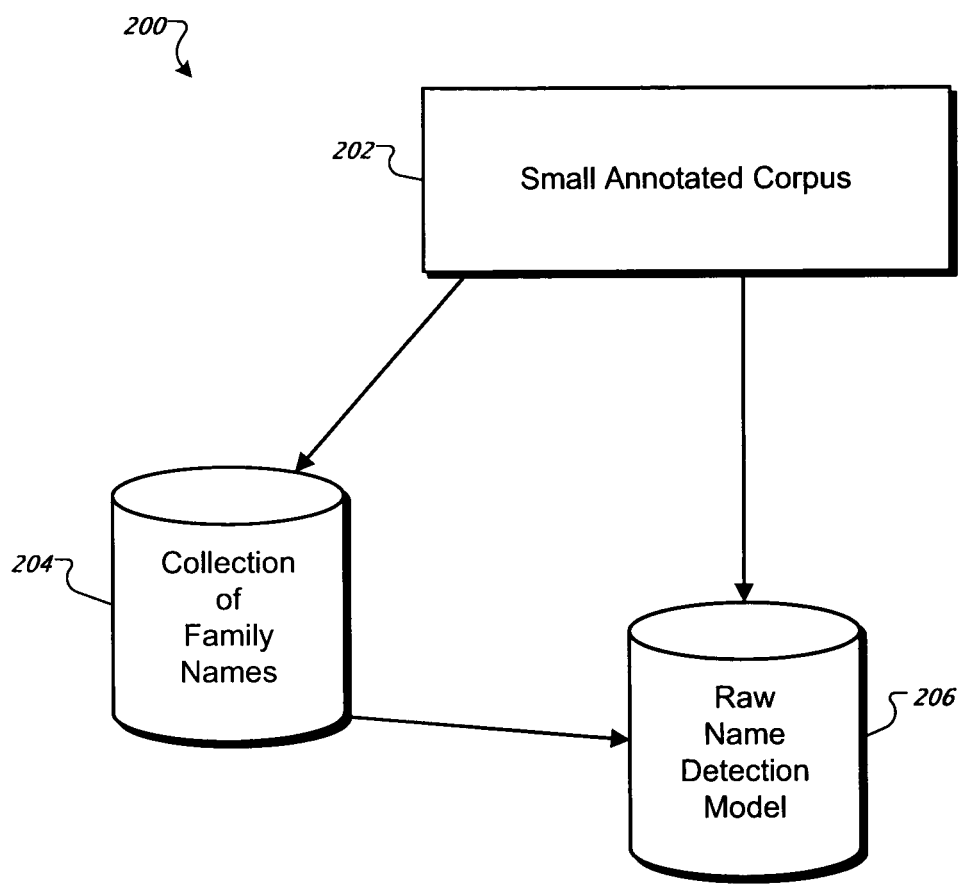
FIG. 2 is a block diagram illustrating an example generation of a raw name detection model.

Some words in Chinese can either be a person's name or a regular word, e.g., 黎 明 can be either the name of a famous singer in China, or a common word meaning daybreak. For example, FIG. 1A shows Chinese text that includes a character sequence 黎明 100 meaning daybreak. As another example, FIG. 1B shows Chinese text that includes a character sequence 黎明 102 as the name of the famous singer in China. These character sequences can be classified as either identifying names or not identifying names.

In particular, n-grams are classified as either identifying names or not identifying names. A given n-gram w can be classified as either identifying a name (NAME) or not identifying a name (NOTNAME) using Bayes Rule. Bayes Rule provides that the probability of a given n-gram w identifying a name given context can be defined as:

$$P(w = \text{NAME} \mid \text{context}) = \frac{P(w = \text{NAME}, \text{context})}{P(\text{context})}.$$

Similarly, the probability of a given n-gram not identifying a name can be defined as:

$$P(w = \text{NOTNAME} \mid \text{context}) = \frac{P(w = \text{NAME}, \text{context})}{P(\text{context})}.$$

Furthermore, a ratio can be defined as:

$$\text{ratio} = \frac{P(w = \text{NAME} \mid \text{context}) L(\text{NAME} \Rightarrow \text{NOTNAME})}{P(w = \text{NOTNAME} \mid \text{context}) L(\text{NAME} \Rightarrow \text{NOTNAME})}.$$

In one implementation, if the resulting ratio value is greater than one, then the n-gram is classified as identifying a name. In other words, a cost-weighted likelihood that the n-gram w identifies a name is greater than a cost-weighted likelihood that the n-gram w does not identify a name. Otherwise, the n-gram is classified as not identifying a name. L represents a particular loss function. In some implementations, the loss function is a constant such that the equation can be simplified as:

$$\text{ratio} = c \cdot \frac{P(w = \text{NAME}, \text{context})}{P(w = \text{NOTNAME}, \text{context})},$$

where c is a constant. The joint probabilities, P(w=NAME, context) and P(w=NOTNAME, context), can be provided as output from a name detection model, as described in further detail below with respect to FIGS. 2-4.

As an initial overview, the name detection model includes a name model, a not-name model, and a language model. A raw name model is generated using a pre-defined collection of family names and an annotated corpus to identify whether n-grams in an annotated corpus identify a name. The raw name model is applied to semi-structured data and large unannotated data to generate a name detection model.

In particular, the name detection model derives probability estimates from P(w=NAME, context) and P(w=NOTNAME, context). Specifically, the joint probability P(w=NAME, context) can be rewritten as:

$P_{name}(W, \text{context}) = P_{name}(\text{prefix}) P_{name}(W \mid \text{prefix}) P_{name}(\text{suffix} \mid W, \text{prefix})$.

$P_{name}(W, \text{context})$ can be further approximated as:

$P_{name}(\text{Prefix}) P_{name}(\text{family\_name}, \text{given\_name} \mid \text{prefix})$
$P_{name}(\text{suffix} \mid \text{family\_name}, \text{given\_name})$    Expression [1]

In addition, the joint probability P(w=NOTNAME, context) can be similarly approximated as:

$P_{noname}(\text{prefix}) P_{noname}(\text{family\_name},$
    $\text{given\_name} \mid \text{prefix}) P_{noname}(\text{suffix} \mid \text{family\_name},$
    $\text{given\_name})$    Expression [2]

Raw Name Detection Model

FIG. 2 is a block diagram 200 illustrating an example generation of a raw name detection model 206. For convenience, generation of the raw name detection model 206 will be described with respect to a system that performs the generation.

In CJK text, a given n-gram can identify a name only if the left character in the n-gram is a family name. The right context is a given name. Therefore, a pre-defined collection of family names 204 is used to generate the raw name detection model 206. The system can generate the raw name detection model 206 using a small amount of annotated training data. The system trains the raw name model 206 by using an annotated corpus (e.g., small annotated corpus 202) and a collection of pre-defined family names 204.

The pre-defined family names 204 includes a collection of family names in one or more CJK languages. For example, for Chinese name detection model, the pre-defined family names 204 can include a collection of 300 common Chinese family names, which statistically cover 99% or more of possible Chinese family names in a given population. The small annotated corpus 202 includes a small collection of text data, for example, web documents or search queries. The text data of the small annotated corpus 202 includes n-grams that have been identified (e.g., annotated) as identifying names or not identifying names. For example, the names can be manually identified by one or more individuals.

After generation, the raw name detection model 206 includes probability estimates calculated as a function of relative frequencies of n-grams in the small annotated corpus 202, with left characters that are found in the collection of family names 204, identifying names and n-grams not identifying names. Thus, the raw name model 206 can be used to calculate the probability than an input n-gram identifies a name or does not identify a name (e.g., to detect a name based on the ratio described above). However, this is limited by the probabilities of the small annotated corpus, which may not be accurate over a large collection of data. As a result, the raw name detection model 206 is further applied to training data to generate a name detection model, as discussed in further detail below with respect to FIG. 3.

Training Data

Figure 3:
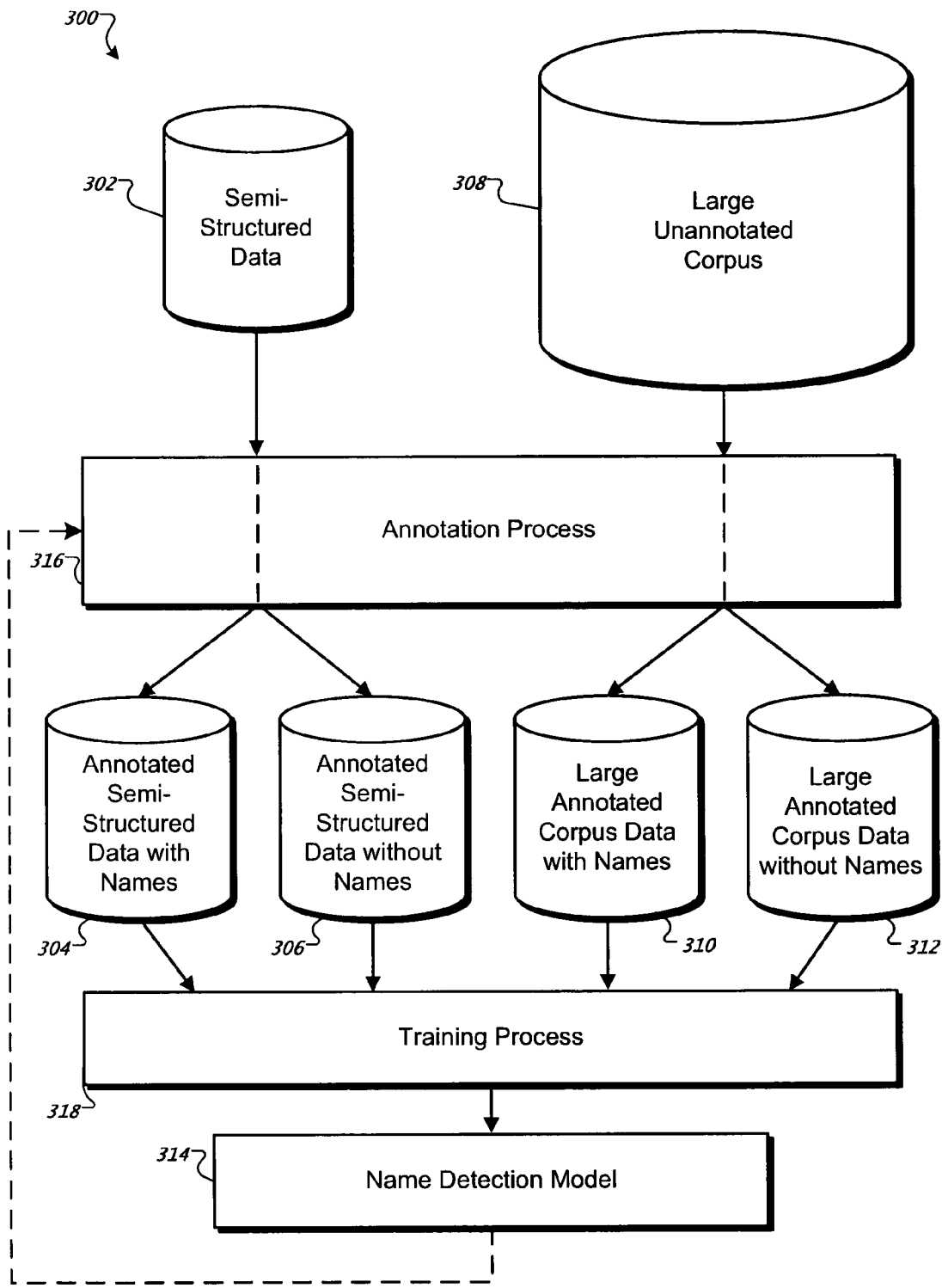
FIG. 3 is a block diagram illustrating an example generation of a name detection model.

FIG. 3 is a block diagram 300 illustrating an example generation of a name detection model 314. An annotation process 316 (e.g., performed by the raw name detection model 206) is applied to unannotated data in order to generate an expanded name detection model. Semi-structured data 302 and a large unannotated corpus 308 can be used as the unannotated data.

Semi-structured data 302 can include, for example, xml files. The semi-structured data 302 can include data having a number of different fields. The particular fields can be used to identify names and not names. For example, the semi-structured data 302 can include XML files identifying music information where one of the fields is an artist field.

The large unannotated corpus 308 provides a collection of text in a target language (e.g., Chinese, Japanese, or Korean). The large unannotated corpus 308 can include a number of different sources of text, including, e.g., web queries, web pages, and news articles. In some implementations, the large unannotated corpus 308 includes text on the order of tens to hundreds of billions of characters, or even more.

The annotation process 316 is applied and forms subsets of training data used to train sub-models of the name detection model 314. In particular, the probability estimates of n-grams identifying names and n-grams not identifying names, determined from the small annotated corpus 202 to generate the raw name detection model 206, are used to separate the training data into training data that identifies names and training data that does not identify names.

The system applies annotation process 316 to the semi-structured data 302 to form annotated semi-structured data (e.g., 304 and 306). In particular, the raw name detection model 206 is used to separate the semi-structured data 302 and form a subset of annotated semi-structured data that includes n-grams identifying names 304, and form a subset of annotated semi-structured data that includes n-grams not identifying names 306. For example, if an xml file contains a n-gram "artist: c1 c2 c3", where "c1 c2 c3" is a CJK name, the n-gram is placed in the subset of annotated semi-structured data that includes n-grams identifying names 304. As another example, if the xml file also contains a n-gram "title: c4 c5", where "c4 c5" does not identify a name (e.g., the title of a song), the n-gram is placed in the subset of annotated semi-structured data that includes n-grams not identifying names 306.

The system also applies annotation process 316 to a large unannotated corpus 308 to form large annotated corpus data (e.g., 310 and 312). In particular, the raw name detection model 206 is used to separate the large unannotated corpus into a set of large annotated corpus data that includes n-grams identifying names 310, and a set of large annotated data that includes n-grams not identifying names 312. For example, if a web page sentence includes the character sequence "c1 c2 c3 c4 c5 c6", where "c2 c3 c4" is a CJK name, then the sentence is placed into the set of large annotated corpus data that includes n-grams identifying names 310. Alternatively, if the annotation process 316, when applied to the sentence, does not detect a name, the sentence is placed into the set of large annotated corpus data that includes n-grams not identifying names 312.

A training process 318 uses the annotated semi-structure data (e.g., 304 and 306) and large annotated corpus data (e.g., 310 and 312) to generate a name detection model 314, as discussed below in further detail with respect to FIG. 4.

In some implementations, the unannotated data can include user input data, including, e.g., scripts of IME and user-edited lists of words or phrases. The system applies annotation process 316 to the user input data to form annotated user input data identifying names and annotated user input data not identifying names. The training process 318 then uses the annotated user input data to generate the name detection model 314.

Name Detection Model

Figure 4:
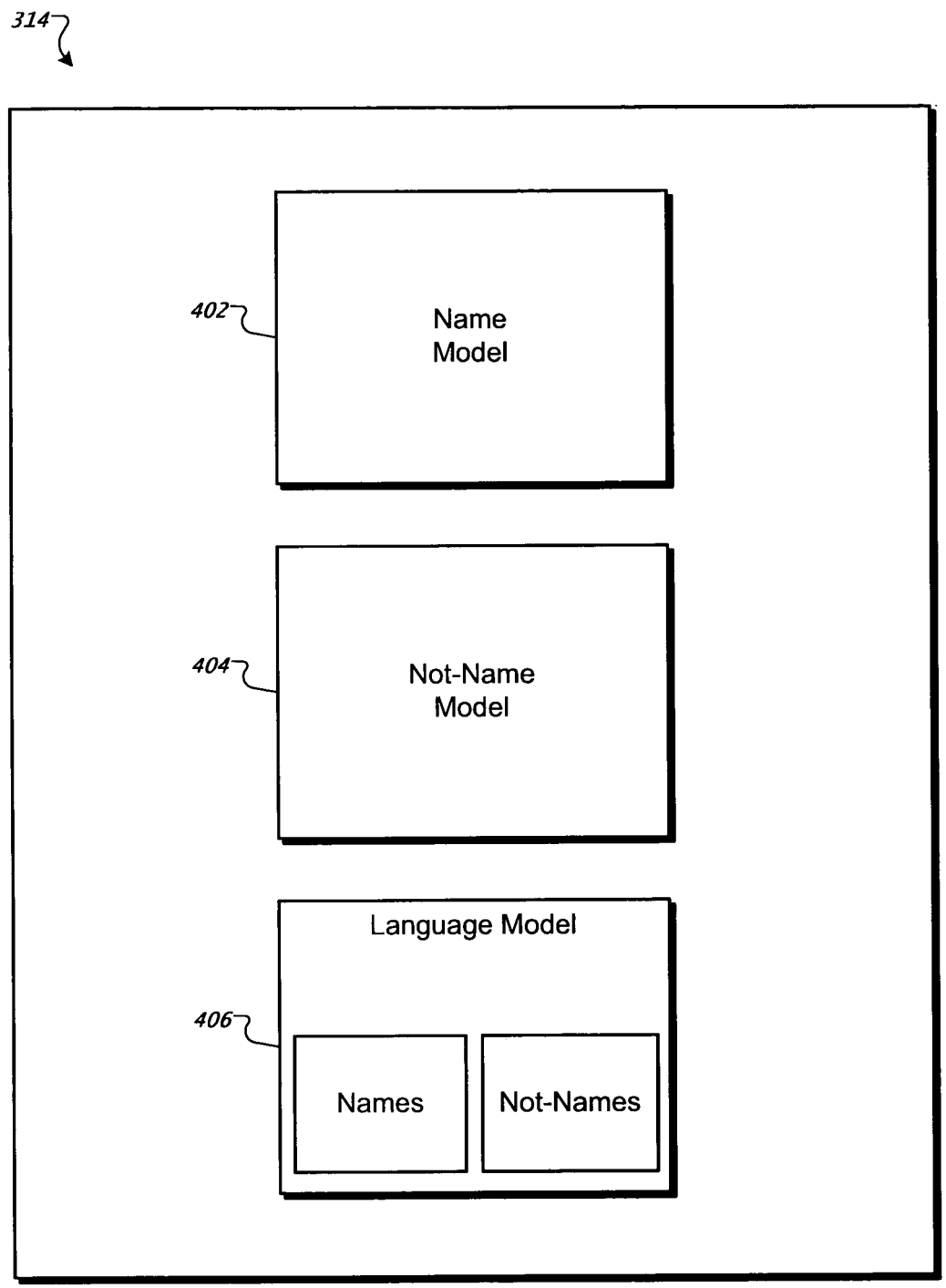
FIG. 4 is a block diagram illustrating components of an example name detection model.

FIG. 4 is a block diagram illustrating components of an example name detection model 314. The name detection model 314 includes a name model 402, not-name model 404, and a language model 406.

Name Model

The subset of semi-structured data that includes n-grams identifying names 304 and the set of large annotated corpus data that includes n-grams identifying names 310 is used to derive a name model 402. The system uses these sets of data to determine the probability that a n-gram including a family name and a given name identifies a name, or:

$P_{name}$(family_name,given_name).

In particular, the subset of semi-structured data that includes n-grams identifying names 304 and the set of large annotated corpus data that includes n-grams identifying names are used to generate probabilities estimates as a function of the relative frequencies of n-grams identifying names occurring in the sets of data.

In some implementations, the annotated user input is used to generate the probability estimates.

Not-Name Model

The subset of semi-structured data that includes n-grams not identifying names is used to derive a not-name model 404. The system uses this subset of data to determine the probability that a n-gram including a family name and a given name does not identify name, or:

$P_{noname}$(family_name,given_name).

In particular, this subset of data is used to generate probabilities estimates as a function of the relative frequencies of n-grams identifying names in the subset of data.

In some implementations, the annotated user input is used to generate the probability estimates.

Language Model

The sets of large annotated data (e.g. 310 and 312) are used to derive a language model 406. The system uses these sets of data to determine the probability that a n-gram identifies a name or does not identify a name using context of the n-gram. Specifically, the system determines the probabilities that a suffix identifies a name given a name candidate and a name candidate identifies a name given a prefix, or:

$P_{name}$(suffix|name) and $P_{name}$(name|prefix), to derive a language sub-model with names.

Furthermore, the system determines the probabilities that a suffix does not identify a name given a name candidate and a name candidate does not identify a name given a prefix, or:

$P_{noname}$(suffix|name) and $P_{noname}$(name|prefix), to derive a language sub-model without names.

A prefix is one or more characters of a sequence of characters that precedes a n-gram name candidate. A suffix is one or more characters of a sequence of characters that follows a n-gram candidate. For example, for the sequence of characters "c1 c2 c3 c4 c5 c6 c7" where the name candidate is "c3 c4 c5", the prefix is "c1 c2" and the suffix is "c6 c7".

The set of large annotated data that includes n-grams identifying names 310 is used to generate probability estimates as a function of relative frequencies of n-grams being names in the set of data given a particular prefix or suffix. Also, the set of large annotated data that includes n-grams not identifying names 312 is used to generate probability estimates as a function of relative frequencies of n-grams not being names in the set of data given a particular prefix or suffix.

In some implementations, the annotated user input is used to generate the probability estimates.

In summary, the raw name detection model 206 is used in an annotation process 316 to separate the semi-structured data 302 and the large unannotated corpus 308 and form annotated semi-structured data (304 and 306) and a large annotated corpus (310 and 312). The system uses this annotated data and a training process 318 to train name detection model 314 including name model 402, not-name model 404, and language model 406.

Refined Formula for Detecting Names

The probability estimates from the name model and the language model are used to determine P(NAME|context). For example, if a sequence of characters is "c1 c2 c3 c4 c5 c6 c7", and "c3 c4 c5" is a name, then the probability that "c3 c4 c5" is a name given the context (i.e., prefix is "c1 c2", and suffix is "c6 c7"), or the P(NAME|context), can be derived from Expression [1] above. P(NAME|context) can be expressed as:

$$P_{name}(c3|\text{prefix})P_{name}(c4c5|c3)P_{name}(\text{suffix}|c3,c4c5).$$

This expression can be rewritten generically as:

$$P_{name}(\text{family\_name}|\text{ prefix})P_{name}(\text{given\_name}|\text{ family\_name})$$
$$P_{name}(\text{suffix}|\text{ family\_name, given\_name}),$$

where $$P_{name}(\text{given\_name}|\text{ family\_name}) = \frac{P_{name}(\text{family\_name, given\_name})}{P_{name}(\text{family\_name})}.$$

As described above, the name model can be trained to determine $P_{name}$(family_name, given_name). Furthermore, the language model can be trained to determine $P_{name}$(family_name|prefix) and $P_{name}$(suffix|family_name, given_name).

The probability estimates from the name model and language model are used to determine P(NOTNAME|context) in a similar manner. For example, if a sequence of characters is "c1 c2 c3 c4 c5 c6 c7", and "c3 c4 c5" is not a name, then the probability that "c3 c4 c5" is not a name given the context (i.e., prefix is "c1 c2", and suffix is "c6 c7"), or the P(NOTNAME|context), can be derived from Expression [2] above. P(NOTNAME|context) can be expressed as:

$$P_{notname}(c3|\text{prefix})P_{notname}(c4c5|c3)P_{notname}(\text{suffix}|c4c5).$$

This expression can be rewritten generically as:

$$P_{notname}(\text{family\_name}|\text{prefix})P_{notname}(\text{given\_name}|\text{family\_name})P_{notname}(\text{suffix}|\text{family\_name,given\_name}).$$

As described above, the not-name model can be trained to determine $P_{notname}$(family_name, given_name). Furthermore, the language model can be trained to determine $P_{notname}$(family_name|prefix) and $P_{notname}$(suffix|family_name, given_name).

Training Iterations

In some implementations, the name detection model 314 is further used to separate the semi-structured data 302 and the large unannotated corpus 308 into annotated semi-structured data (304 and 306) and a large annotated corpus (310 and 312). For example, in FIG. 3, name detection model 314 is used in the annotation process 316 to separate the semi-structured data 302 and large unannotated corpus 308. In some implementations, these new sets of training data are used to generate a more refined name detection model. The more refined name detection model has greater coverage than the raw name detection model due to the use of larger training data to derive probability estimates of n-grams either identifying names or not identifying names.

In some implementations, the annotated user input is used to generate the more refined name detection model.

Further refinements of the name detection model can be achieved by training the name detection model in two or more iterations. Each iterations enhances the coverage of the name model. In some implementations, a number of iterations (e.g., three iterations) can be specified. Alternatively, the number of iterations can be based on conditions, for example, the condition that the probability estimates provided as output by the name detection model do not change more than a threshold between iterations.

Further Refinements to the Name Detection Model

The relative frequency can be low for particular names (e.g. sparse names, sparse family names, or foreign names that have a low frequency of occurrence in the training data). As a result, the corresponding probability estimates can be inaccurate. This results in additional sparse data problems. Therefore, smoothing techniques can be used to account for low frequency, or sparse names. If the frequency of a sequence of characters occurring in the training data is less than a threshold, smoothing techniques can be used.

Sparse Names

In some implementations, the probability of a name occurring is independent of the probabilities of a family name occurring and a given name occurring. For example, if "y" is a given name for a family name "x", then a name is "x y". Furthermore, "z" can be a sparse family name. Name "z y" represents the sparse family name "z" and a given name "y", where the sparse family name "z" was not sampled or was sampled at a low frequency (e.g., below a specified threshold frequency). In one implementation, the system uses the probability of "x y" to approximate the probability of "z y". In particular, the probabilities of the event that "x" is a family name and the event that "y" is a given name are treated independently.

As a result, the probability of a given name "y" occurring given a sparse family name "z", or P(y|z), can be approximated in terms of statistics of "x y", where:

$$P(y|z) = \frac{\# \, xy}{\# \, x} \cdot \frac{\# \, z}{\# \, \text{all\_family\_names}}.$$

For example, if the frequency of "z y" in the training data is less than a threshold, the probability that "z y" is a name is a function of the probability that "y" is a given name for any name and the probability of the family name "z" occurring.

For example, returning to the refined formula for detecting names, the $P_{notname}$(suffix|family_name, given_name) may not be precisely estimated. In some implementations, a back-off strategy can be implemented such that $P_{notname}$(suffix|family_name, given_name) can be expressed as:

BackoffWeight(family_name,given name)$P_{notname}$(suffix|all_family_names,given_name).

Sparse Family Names

In some implementations, a probability of all sparse family names is used as a substitute for a probability of a single sparse family name. For example, if "a" is a given name and "b" is a family name. The probability of a name occurring given context can be represented by P(a|b)P(b|context). If "b" is a sparse family name, the probability P(a|b) can be inaccurate. In this implementation, the probability of a name occurring in a given context is more accurately represented by using the probability that "a" occurs in the training data given all sparse family names multiplied by the probability that all sparse family names occurs in the training data given the context, or:

P(a|all_sparse_family_names)P(b|all_sparse_family)P(all_sparse_family_names|context Foreign Name Detection Model The relative frequency of foreign names (e.g., translated names) can also be low and result in inaccurate probability estimates. Therefore, a foreign name detection model can be generated according to the same steps described above with respect to generating a name detection model 314. In particular, a raw foreign name detection model is generated from a pre-defined collection of foreign last names in a similar manner as generating the raw name detection model 206. The raw foreign name detection model can be applied to other data (e.g., large unannotated data and semi-structured data) to generate a foreign name detection model in a similar manner as generating the name detection model 314.

Segmentation

When using the name detection model to detect names for a given input sequence of n-grams, the probability estimates of the n-grams either identifying names or not identifying names are used to segment sequences of characters into words and simultaneously detect names.

In some implementations, a sequence of CJK characters are arranged in a hidden Markov model. A hidden Markov model is a statistical model that includes hidden parameters and observable parameters. For example, the observable parameters are the sequence of CJK characters, and the hidden parameters are possible sequences of CJK words. Specifically, particular sequences of characters in CJK can result in one or more sequences of words because CJK characters or combinations of CJK characters can have different meanings. For example, a sequence of characters "c1 c2 c3" is a possible sequence of a CJK word. In addition, "c1 c2" can also be a possible sequence of another CJK word.

In some implementations, a Viterbi algorithm is used to segment the hidden Markov model. The Viterbi algorithm is a dynamic programming algorithm for finding the most likely sequence of hidden states (e.g. segmentation paths) that results in a sequence of observed events. For example, the Viterbi algorithm is used to find the most likely sequence of CJK words that results in a sequence of CJK characters.

The most likely sequence of CJK words can be written as:

$$\arg\max_{W} P(W \mid C),$$

which describes the sequence of CJK words, W, out of all possible sequences of CJK words, that provide the highest value for P(W|C), where $W=w_1, w_2, \ldots w_M$ and C is a sequence of CJK characters represented by $C=c_1, c_2, \ldots c_L$. Additionally, Bayes Rule provides that:

$$P(W \mid C) = \frac{P(W)P(C \mid W)}{P(C)}.$$

The language model provides P(W). Using Bayes Rule, the most likely sequence of CJK words given a sequence of CJK characters can be re-written as:

$$\arg\max_{W} P(W \mid C) = \arg\max_{W} P(W \mid C)P(W).$$

Consequently, the most likely W (i.e., the most likely sequence of CJK words) is one that maximizes the product of the probability that W occurs and the probability that W would consist of C (i.e., the probability that a given sequence of CJK words would map onto a sequence of CJK characters).

CJK name detection detects CJK names as it is segmenting the sequence of characters into words.

Figure 5:
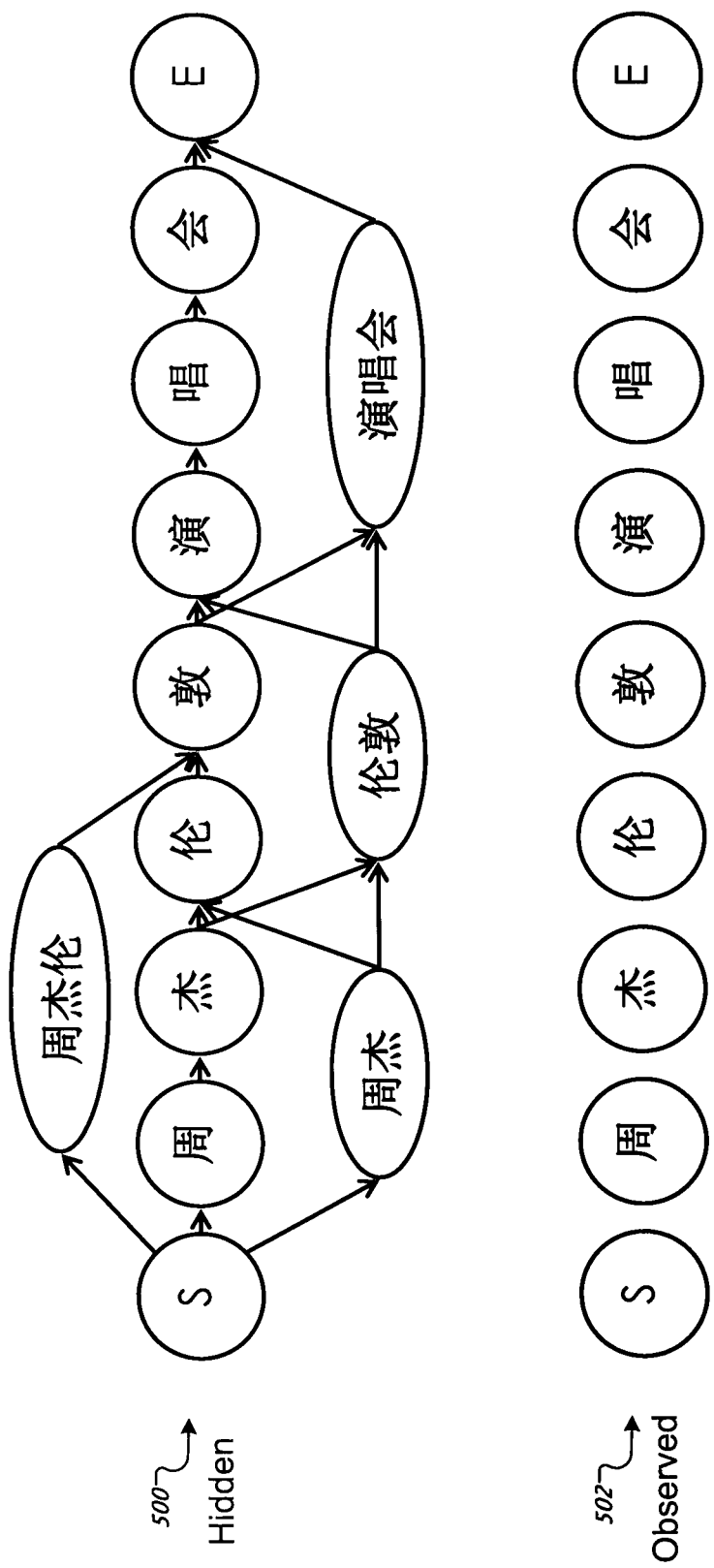
FIG. 5 is a block diagram illustrating an example hidden Markov model for an observed sequence of Chinese characters.

Referring to FIG. 5, for example, an observed input string of CJK characters 502 includes "周杰伦敦演唱会", where "周" is preceded by an identifier <S> designating the beginning of the sequence and "会" is followed by an identifier <E> designating the end of the sequence.

Assume that the sequence of characters "伦敦" and "演唱会" are words that have been previously detected in training. Further, assume that "周杰" and "周杰伦" are potential names (i.e., have been detected as identifying names in the training data). In the naïve model, if "周杰" and "周杰伦" have never been detected as words, the probability of "周杰" and "周杰伦" being words is low, and the sequence of characters would likely be segmented into single characters. Detecting names after this segmentation scheme results in errors.

In the naïve model, some example segmentations of words in a hidden Markov model (e.g., hidden Markov model 500) are:

<S> "周" "杰" "伦" "敦" "演" "唱" "会" <E>,
<S> "周" "杰" "伦" "敦" "演唱会" <E>,
<S> "周" "杰" "伦敦" "演" "唱" "会" <E>, and
<S> "周" "杰" "伦敦" "演唱会" <E>.

However, incorporating the name detection model, the sequence of characters "周 杰" can be detected as characters that potentially identify a name; and the sequence of characters "周 杰 伦" can also be detected as characters that potentially identify a name. These sequences of characters have associated probabilities of being words, in the sense that the sequences of characters have associated probabilities of potentially identifying a name.

Therefore, other example segmentations of words are added to the model. In this refined hidden Markov model, additional example segmentations of words are:

<S> "周杰" "伦" "敦" "演" "唱" "会" <E>,
<S> "周杰" "伦" "敦" "演唱会" <E>,
<S> "周杰" "伦敦" "演" "唱" "会" <E>,
<S> "周杰" "伦敦" "演唱会" <E>; and
<S> "周杰伦" "敦" "演" "唱" "会" <E>,
<S> "周杰伦" "敦" "演唱会" <E>,
<S> "周杰伦" "敦" "演" "唱" "会" <B>.

Using this model, segmenting a sequence of characters includes segmenting the sequence of characters into words depending on the likelihood of the segmentation including a potential name. The introduction of other likely sequences that include potential names prevents the aforementioned segmentation errors from propagating into name detection. If a segmentation path including a name is more likely to occur than a segmentation path that does not include a name, then the segmentation path including a name is used and a name is detected. The detected sequence of characters identifying a name and its corresponding probability of identifying a name is added to the name detection model 314.

In some implementations, the name detection model 314 is used to detect names in an input text. For example, a detector receives CJK input text and uses the name detection model 314 to simultaneously segment the CJK input text into words and detect names from the CJK input text.

Figure 6:
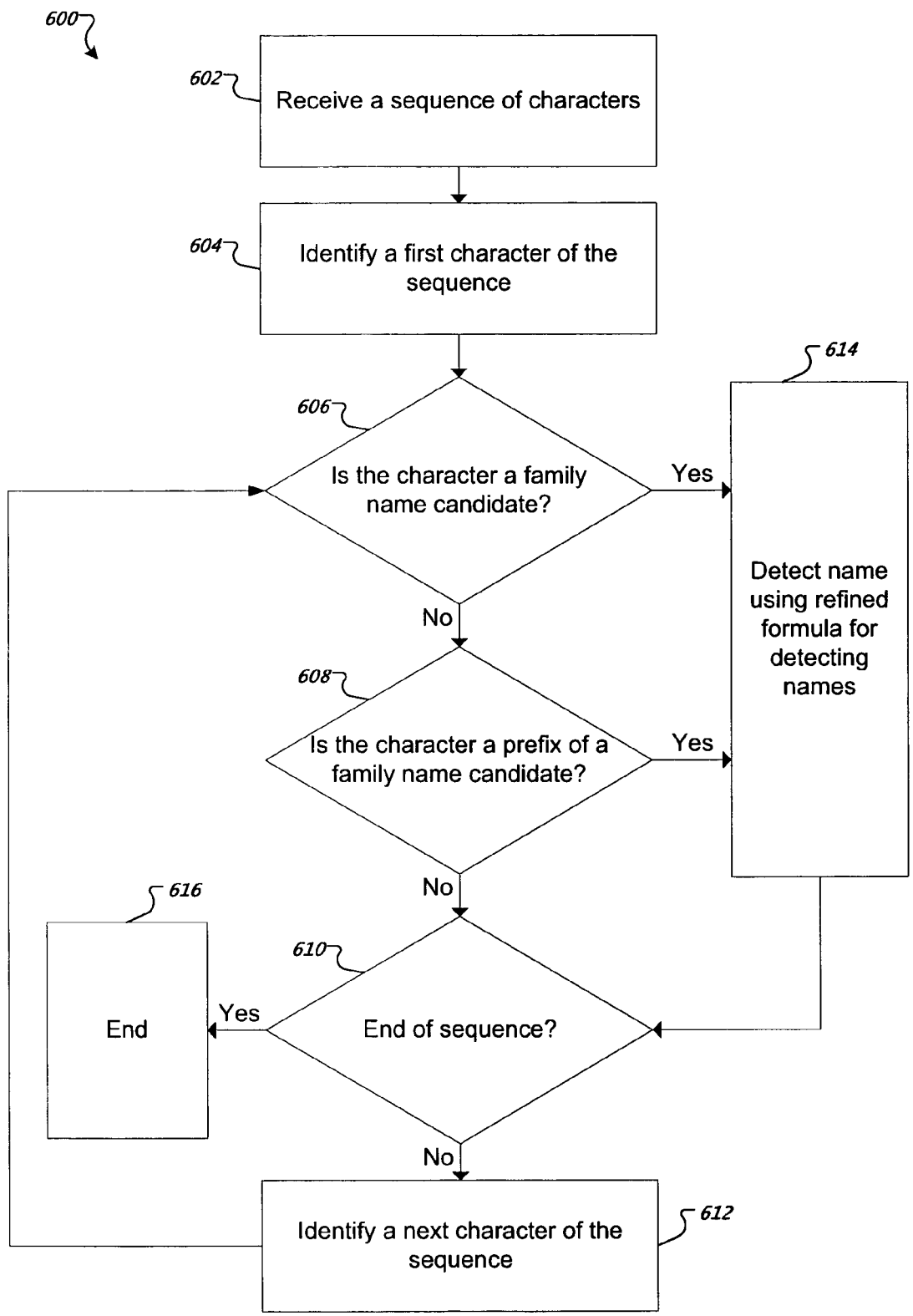
FIG. 6 is a flow chart showing an example process for detecting names.

FIG. 6 is a flow chart showing an example process for detecting names 600. For convenience, the process for detecting names 600 will be described with respect to a system that performs the detection. During process for detecting names 600, the system scans a received sequence of characters from the beginning of the sequence until the end of the sequence for names.

The system receives 602 a sequence of characters (e.g., a sequence of Chinese characters). In particular, the system identifies 604 a first character of the sequence. The system determines 606 if the identified character is a family name candidate. If the character is a family name candidate (e.g., a character in the collection of family names 204), the system detects 614 names using the refined formula for detecting names (e.g., the ratio with refinements), as described above.

If the character is not a family name candidate, then the system determines 608 if the character is a prefix of a family name candidate. If the character is a prefix of a family name candidate, then the system detects 614 names using the refined formula for detecting names (e.g., the ratio with refinements), as described above.

If the character is not a prefix of a family name candidate, then the system determines 610 if the system has reached the end of the sequence of characters. Similarly, after detecting 614 names using the refined formula for detecting names, the system also determines 610 if the system has reached the end of the sequence of characters. If the system reaches the end of the sequence, the process terminates 616. If the system has not reached the end of the sequence of characters, then the system identifies 612 a next character of the sequence and repeats steps 606, 608, 610, and optionally 614 for other characters of the sequence until the end of the sequence is reached.

Example System

Figure 7:
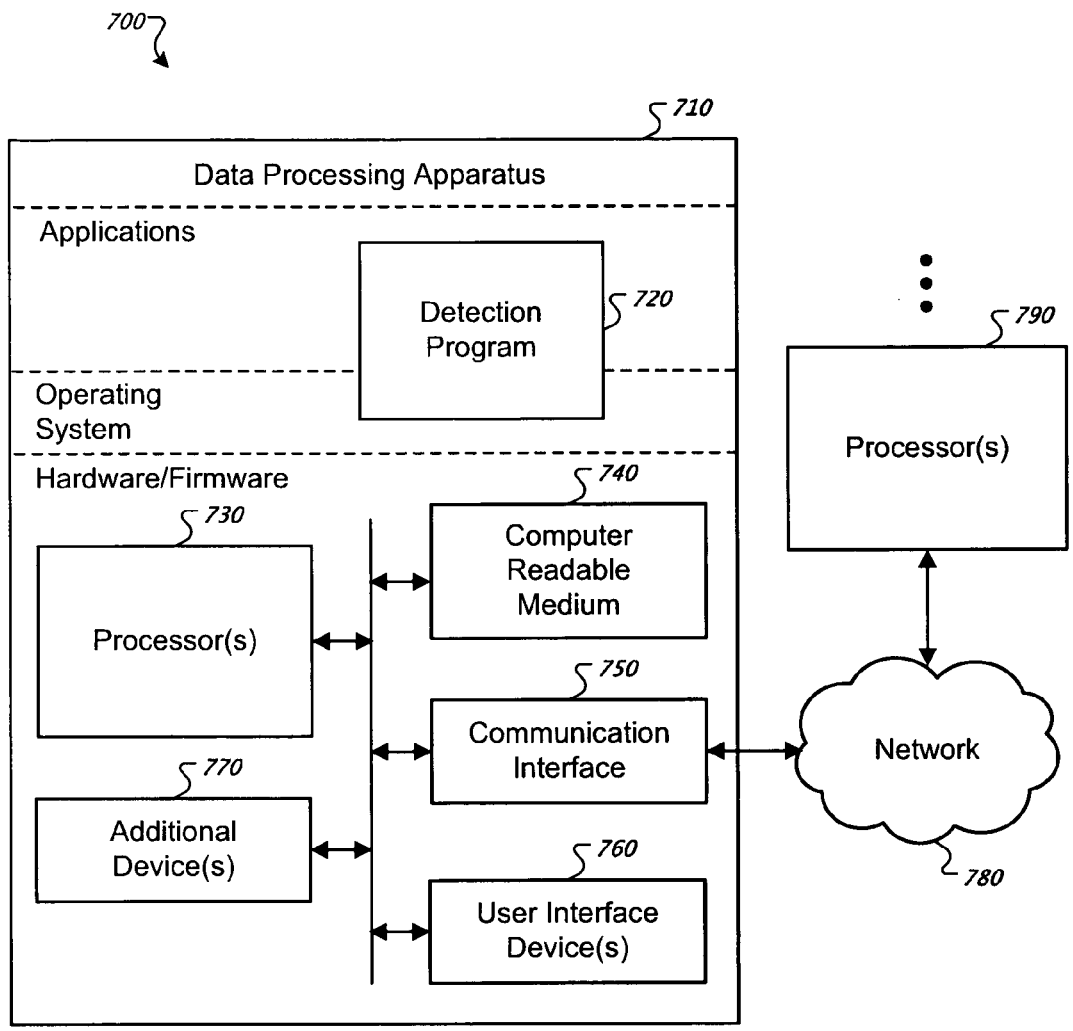
FIG. 7 is an example system for CJK name detection.

FIG. 7 is an example system 700 for CJK name detection. A data processing apparatus 710 can include hardware/firmware, an operating system and one or more programs, including detection program 720. The detection program 720 operates, in conjunction with the data processing apparatus 710, to effect the operations described in this specification. Thus, the detection program 720, in combination with one or more processors and computer-readable media (e.g., memory), represents one or more structural components in the system 700.

The detection program 720 can be a detection processing application, or a portion. As used here, an application is a computer program that the user perceives as a distinct computer tool used for a defined purpose. An application can be built entirely into the operating system (OS) of the data processing apparatus 710, or an application can have different components located in different locations (e.g., one portion in the OS or kernel mode, one portion in the user mode, and one portion in a remote server), and an application can be built on a runtime library serving as a software platform of the apparatus 710. Moreover, application processing can be distributed over a network 780 using one or more processors 790. For example, a language model of the detection program 720 can be distributively trained over the one or more processors 790.

The data processing apparatus 710 includes one or more processors 730 and at least one computer-readable medium 740 (e.g., random access memory, storage device, etc.). The data processing apparatus 710 can also include a communication interface 750, one or more user interface devices 760, and one or more additional devices 770. The user interface devices 760 can include display screens, keyboards, mouse, stylus, or any combination thereof.

Once programmed, the data processing apparatus 710 is operable to generate the language model, name models, and foreign name models.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a digital picture frame, a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method implemented by data processing apparatus, the method comprising:
    generating a raw name detection model using a collection of family names and an annotated corpus including a collection of n-grams, each n-gram having a corresponding probability of occurring as a respective name in the annotated corpus;
    applying the raw name detection model to a collection of semi-structured data to form annotated semi-structured data, the annotated semi-structured data identifying n-grams identifying names and n-grams not identifying names;
    applying the raw name detection model to a large unannotated corpus to form a large annotated corpus data identifying n-grams of the large unannotated corpus identifying names and n-grams not identifying names; and
    generating a name detection model including:
        deriving a name model using the annotated semi-structured data identifying names and the large annotated corpus data identifying names,
        deriving a not-name model using the semi-structured data not identifying names,
        deriving a language model using the large annotated corpus; and
    wherein generating and applying are performed by data processing apparatus.

2. The method of claim 1, further comprising:
    applying the name detection model to the collection of semi-structured data to form the annotated semi-structured data, the annotated semi-structured data identifying the n-grams identifying names and the n-grams not identifying names;
    applying the name detection model to the large unannotated corpus to form the large annotated corpus data identifying the n-grams of the large unannotated corpus identifying names and the n-grams not identifying names; and
    generating a refined name detection model including:
        deriving a refined name model using the annotated semi-structured data identifying names and the large annotated corpus data identifying names,
        deriving a refined not-name model using the semi-structured data not identifying names, and deriving a refined language model using the large annotated corpus.

3. The method of claim 1, wherein the name model includes:
a collection of the n-grams from the annotated semi-structured data identifying names and the large annotated corpus identifying names, wherein each n-gram includes a family name as a left character and a given name as right context, and each n-gram has a corresponding probability of identifying a respective name.

4. The method of claim 1, wherein the not-name model includes:
a collection of the n-grams from the annotated semi-structured data not identifying names, where each n-gram includes a family name as a left character and a given name as right context, and each n-gram has a corresponding probability of not identifying a respective name.

5. The method of claim 1, wherein each n-gram of the collection of n-grams of the annotated corpus includes a left character that is a family name from the collection of family names, and wherein the n-gram has a corresponding probability of identifying a respective name according to a relative frequency of the respective name in the annotated corpus.

6. The method of claim 1, wherein the raw name model is generated using a collection of foreign family names.

7. The method of claim 1, wherein:
the collection of family names includes a plurality of sparse family names; and
wherein the raw name detection model uses a single probability for the plurality of sparse family names in place of a calculated probability of a specific sparse family name of the plurality of spare family names to identify the corresponding probability of one or more n-grams that each includes a left character that is a sparse family name and that each identify a respective name.

8. The method of claim 1, wherein the collection of family names includes a plurality of foreign family names.

9. The method of claim 1 further comprising:
calculating a probability that a particular sequence of characters identifies a name, wherein the name includes a family name and a given name,
by determining the probability that the particular sequence identifies a name as a function of a relative frequency that a portion of the sequence representing the given name occurs with any family name and the relative frequency of a portion of the sequence representing the family name.

10. The method of claim 1 further comprising:
applying the raw name detection model to input data to form annotated input data, the annotated input data identifying n-grams identifying names and n-grams not identifying names;
where generating the name detection model further comprises:
deriving the name model using the annotated user input data identifying names,
deriving the not-name model using the annotated user input data not identifying names, and
deriving the language model using the annotated user input data.

11. A computer program product, stored on a machine-readable storage device that, when executed by data processing apparatus, causes the data processing apparatus to perform operations comprising:
generating a raw name detection model using a collection of family names and an annotated corpus including a collection of n-grams, each n-gram having a corresponding probability of occurring as a respective name in the annotated corpus;
applying the raw name detection model to a collection of semi-structured data to form annotated semi-structured data, the annotated semi-structured data identifying n-grams identifying names and n-grams not identifying names;
applying the raw name detection model to a large unannotated corpus to form a large annotated corpus data identifying n-grams of the large unannotated corpus identifying names and n-grams not identifying names; and
generating a name detection model including:
deriving a name model using the annotated semi-structured data identifying names and the large annotated corpus data identifying names,
deriving a not-name model using the semi-structured data not identifying names, and
deriving a language model using the large annotated corpus.

12. The computer program product of claim 11 wherein the operations further comprise:
applying the name detection model to the collection of semi-structured data to form the annotated semi-structured data, the annotated semi-structured data identifying the n-grams identifying names and the n-grams not identifying names;
applying the name detection model to the large unannotated corpus to form the large annotated corpus data identifying the n-grams of the large unannotated corpus identifying names and the n-grams not identifying names; and
generating a refined name detection model including:
deriving a refined name model using the annotated semi-structured data identifying names and the large annotated corpus data identifying names,
deriving a refined not-name model using the semi-structured data not identifying names, and
deriving a refined language model using the large annotated corpus.

13. The computer program product of claim 11, wherein the name model includes:
a collection of the n-grams from the annotated semi-structured data identifying names and the large annotated corpus identifying names, wherein each n-gram includes a family name as a left character and a given name as right context, and each n-gram has a corresponding probability of identifying a respective name.

14. The computer program product of claim 11, wherein the not-name model includes:
a collection of the n-grams from the annotated semi-structured data not identifying names, where each n-gram includes a family name as a left character and a given name as right context, and each n-gram has a corresponding probability of not identifying a respective name.

15. The computer program product of claim 11, wherein each n-gram of the collection of n-grams of the annotated corpus includes a left character that is a family name from the collection of family names, and wherein the n-gram has a corresponding probability of identifying a respective name according to a relative frequency of the respective name in the annotated corpus.

16. The computer program product of claim 11, wherein the raw name model is generated using a collection of foreign family names.

17. The computer program product of claim 11, wherein the collection of family names includes a plurality of sparse family names; and
wherein the raw name detection model uses a single probability for the plurality of sparse family names in place of a calculated probability of a specific sparse family name of the plurality of spare family names to identify the corresponding probability of one or more n-grams that each include a left character that is a sparse family name and that each identify a respective name.

18. The computer program product of claim 11, wherein the collection of family names includes a plurality of foreign family names.

19. The computer program product of claim 11, wherein the operations further comprise:
calculating a probability that a particular sequence of characters identifies a name, wherein the name includes a family name and a given name by determining the probability that the particular sequence identifies a name as a function of a relative frequency that a portion of the sequence representing a given name occurs with any family name and the relative frequency of a portion of the sequence representing the family name.

20. The computer program product of claim 11, wherein the operations further comprise:
applying the raw name detection model to input data to form annotated input data, the annotated input data identifying n-grams identifying names and n-grams not identifying names;
wherein generating the name detection model further comprises:
deriving the name model using the annotated user input data identifying names,
deriving the not-name model using the annotated user input data not identifying names, and
deriving the language model using the annotated user input data.

21. A system comprising:
a machine-readable storage device having instructions stored thereon; and
data processing apparatus programmed to execute the instructions to perform operations comprising:
generating a raw name detection model using a collection of family names and an annotated corpus including a collection of n-grams, each n-gram having a corresponding probability of occurring as a respective name in the annotated corpus;
applying the raw name detection model to a collection of semi-structured data to form annotated semi-structured data, the annotated semi-structured data identifying n-grams identifying names and n-grams not identifying names;
applying the raw name detection model to a large unannotated corpus to form a large annotated corpus data identifying n-grams of the large unannotated corpus identifying names and n-grams not identifying names; and
generating a name detection model including:
deriving a name model using the annotated semi-structured data identifying names and the large annotated corpus data identifying names,
deriving a not-name model using the semi-structured data not identifying names, and
deriving a language model using the large annotated corpus.

22. The system of claim 21 wherein the operations further comprise:
applying the name detection model to the collection of semi-structured data to form the annotated semi-structured data, the annotated semi-structured data identifying the n-grams identifying names and the n-grams not identifying names;
applying the name detection model to the large unannotated corpus to form the large annotated corpus data identifying the n-grams of the large unannotated corpus identifying names and the n-grams not identifying names; and
generating a refined name detection model including:
deriving a refined name model using the annotated semi-structured data identifying names and the large annotated corpus data identifying names,
deriving a refined not-name model using the semi-structured data not identifying names, and
deriving a refined language model using the large annotated corpus.

23. The system of claim 21, wherein the name model includes:
a collection of the n-grams from the annotated semi-structured data identifying names and the large annotated corpus identifying names, wherein each n-gram includes a family name as a left character and a given name as right context, and each n-gram has a corresponding probability of identifying a respective name.

24. The system of claim 21, wherein the not-name model includes:
a collection of the n-grams from the annotated semi-structured data not identifying names, where each n-gram includes a family name as a left character and a given name as right context, and each n-gram has a corresponding probability of not identifying a respective name.

25. The system of claim 21, wherein each n-gram of the collection of n-grams of the annotated corpus includes a left character that is a family name from the collection of family names, and wherein the n-gram has a corresponding probability of identifying a respective name according to a relative frequency of the respective name in the annotated corpus.

26. The system of claim 21, wherein the raw name model is generated using a collection of foreign family names.

27. The system of claim 21, wherein
the collection of family names includes a plurality of sparse family names; and
wherein the raw name detection model uses a single probability for the plurality of sparse family names in place of a calculated probability of a specific sparse family name of the plurality of spare family names to identify the corresponding probability of one or more n-grams that each include a left character that is a sparse family name and that each identify a respective name.

28. The system of claim 21, wherein the collection of family names includes a plurality of foreign family names.

29. The system of claim 21, wherein the operations further comprise:
calculating a probability that a particular sequence of characters identifies a name, wherein the name includes a family name and a given name by determining the probability that the particular sequence identifies a name as a function of a relative frequency that a portion of the sequence representing a given name occurs with any family name and the relative frequency of a portion of the sequence representing the family name.

30. The system of claim 21, wherein the operations further comprise:
- applying the raw name detection model to input data to form annotated input data, the annotated input data identifying n-grams identifying names and n-grams not identifying names;
- wherein generating the name detection model further comprises:
  - deriving the name model using the annotated user input data identifying names,
  - deriving the not-name model using the annotated user input data not identifying names, and
  - deriving the language model using the annotated user input data.

* * * * *

UNITED STATES PATENT AND TRADEMARK OFFICE
CERTIFICATE OF CORRECTION

PATENT NO.           : 8,478,787 B2                                              Page 1 of 1
APPLICATION NO.      : 12/746465
DATED                : July 2, 2013
INVENTOR(S)          : Jun Wu et al.

It is certified that error appears in the above-identified patent and that said Letters Patent is hereby corrected as shown below:

In the Claims:

Column 17, line 33, Claim 7, please delete "spare" and insert therefor -- sparse --;

Column 17, line 35, Claim 7, please delete "includes" and insert therefor -- include --;

Column 19, line 7, Claim 17, please delete "spare" and insert therefor -- sparse --; and Column 20, line 52, Claim 27, please delete "spare" and insert therefor -- sparse --.

Signed and Sealed this
Third Day of December, 2013

Margaret A. Focarino
*Commissioner for Patents of the United States Patent and Trademark Office*